March 31, 1964 M. D. AASEN 3,127,606
ANGLE INFORMATION DURING JAM CONDITION IN
PULSE DOPPLER SEARCH-WHILE-TRACK RADAR
Filed Feb. 11, 1960
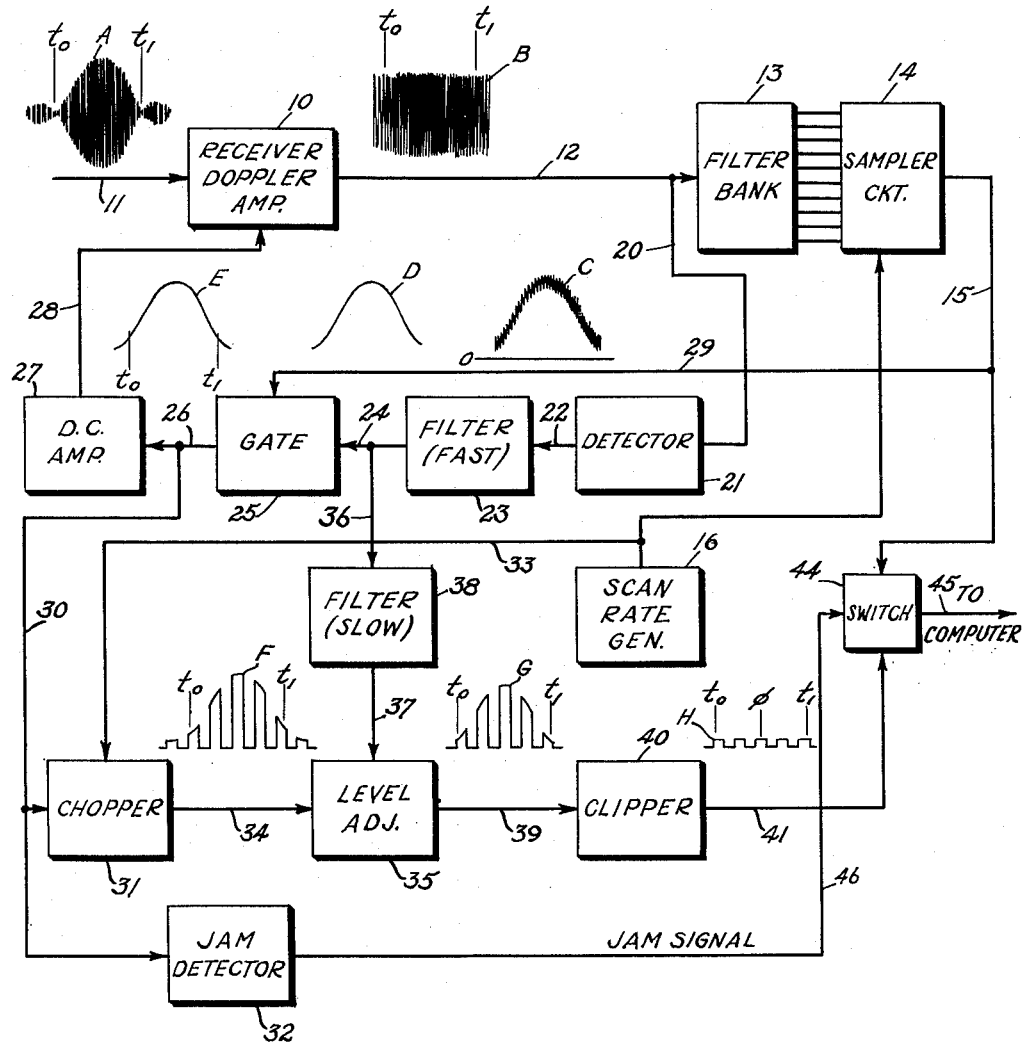
INVENTOR.
MARVIN D. AASEN
BY
*H. H. Losche*
ATTORNEYS

United States Patent Office 3,127,606
Patented Mar. 31, 1964

3,127,606
ANGLE INFORMATION DURING JAM CONDITION IN PULSE DOPPLER SEARCH-WHILE-TRACK RADAR
Marvin D. Aasen, Glen Burnie, Md., assignor, by mesne assignments, to the United States of America as represented by the Secretary of the Navy
Filed Feb. 11, 1960, Ser. No. 8,198
9 Claims. (Cl. 343—8)

This invention relates to radar systems for detecting and positioning target objects and more particularly to pulse Doppler radar receiver systems for detecting and determining the position of a target which may be emitting jam signals to avoid detection.

It is of common knowledge that radar detection of targets can be minimized or eliminated by the target or other associated source emitting radar jamming signals, as in a case of a pulse Doppler radar system, which feeds signal information from a Doppler amplifier to a filter bank to be sample detected for target information. Jamming signals are designed to saturate the filter bank to minimize or eliminate the possibility of sample detection of the target. These jamming signals are ordinarily produced in the form of random frequencies such as noise signals of such frequency and amplitude to saturate the threshold of the filter circuits thereby destroying their function of band pass filtering of frequencies in the frequency band of the transmitter and the expected target echo. In a Doppler radar receiver of the type having the Doppler amplifier to transmit signal information to a sample filter bank, the noise or jam frequencies have been minimized to a great extent by the use of a fast automatic gain control feedback circuit to reduce the gain of the Doppler amplifier in proportion to the strength of jam noise signals. This automatic gain control circuit is more particularly shown and described in an application filed by Marvin D. Aasen and George R. Hetrick, filed on February 12, 1960, bearing Serial Number 8,470. In the device of Aasen and Hetrick the noise or jam signals are suppressed in the Doppler amplifier output to prevent saturation of the filter bank whereby target signals may be more readily sampled and selected by the filter bank sampling circuit.

In the present invention both the target signal information detected in the sample circuit of the filter bank and signal information produced from the automatic gain control circuit by jam or noise signals are selectively switched to subsequent circuitry, such as computers or the like, for determining the exact center of the signal by beam splitting to accurately position the target. By this invention the jam or noise signal information detected in the automatic gain control circuit to produce a direct-current gain control voltage is conducted in parallel to a chopper circuit and a detector circuit, hereinafter referred to as a jam detector circuit. The chopper circuit output is controlled by a level adjusting circuit to cut out the lower amplitudes or "grass" of the chopped direct-current voltages, this level adjusting circuit being through a slow filtering means from the automatic gain control circuit. The chopped voltage signals are applied to a clipper circuit to produce a clipped and chopped voltage signal of a time duration corresponding to the direct-current control voltage. The jam detector detects any direct-current gain control voltage changes, the output of which is used to selectively switch the sampled output of the filter bank circuit and the output of the clipper circuit to a computer or other device designed to receive the target signal information. Since jam or noise signal frequencies clutter the target signal, these noise or jam signals can be detected in the automatic gain control circuit to produce a direct-current voltage that may be readily chopped and clipped in the jam signal circuit and the nodes in such direct-current control voltages will be detected by the jam detector. To produce a chopped and clipped circuit of definite and specific duration during the dwell time of target illumination by the radar antenna, the computer selects and thereafter computes the centroid of the jam signal to accurately position the target by the coordination of signals fixing the azimuthal and elevational position of the antenna during this dwell time. In this manner the jam or noise signals produced by targets for countermeasures to Doppler radar systems are used as "beacons" to assist in the positioning of that target with respect to the Doppler radar receiver system. It is therefore a general object of this invention to utilize both the pulse Doppler target echo signals and the noise or jamming signals of a target to determine target position.

These and other objects and the attendant advantages and uses may become more apparent as the description proceeds when considered along with the accompanying drawing illustrating in a block and functional circuit diagram a part of a Doppler radar receiver for making use of the target echo signal or of the jamming signals to produce target position information.

Referring more particularly to the figure illustration, there is shown a receiver Doppler amplifier 10 for receiving pulse Doppler radar information by way of the input conductor 11 and for conducting the amplified output over a conductor means 12 to a filter bank 13. A sampler circuit 14 is constructed and arranged in combination with the filter bank 13 to sequentially sample each filter channel in the filter bank 13 and to transmit the sample output of an echo signal on the output conductor 15 of the sampler circuit. The filter bank 13 and sampler circuit 14 may be of the commutator or switched circuit types that are old and well-known to those skilled in the art of sampling filter banks, an example of which may be seen in the publication American Institute of Electrical Engineers, vol. 72, part I, March 1953, pages 63–68, article entitled "Analysis of a Comb Filter Using Synchronously Commutated Capacitors," by Le Page, Cahn, and Brown. Another example may be found in Proceedings of the Institute of Radio Engineers, vol. 37, 1949, pages 478–488, article entitled "Some Relations Between Speed of Indication, Bandwidth, and Signal-to-Random-Noise Ratio in Radio Navigation and Direction Finding," by Busignies and Dishal. The sampler and filter bank circuit may have the commutator or switching circuit driven at a predetermined rate by a scan rate generator 16 of any well-known type recognized by those skilled in the art such as a synchronous motor where the sampler and filter bank may be directly driven by the output shaft thereof. Any target echo signal conducted by the input conductor 11 to the receiver Doppler amplifier 10 will be amplified and conducted to the filter bank 13 where the sampler circuit can select the frequency range by sampling the several filter channels of the filter bank to transmit this sampled frequency range of the target echo over the output conductor 15. If a jamming signal is transmitted by a target object this jamming signal will be applied to the receiver Doppler amplifier in the form of a one-way radiation pattern of $$\frac{\sin x}{x}$$

represented by the amplitude envelope A in the drawing. Further discussion of the $$\frac{\sin x}{x}$$

radiation pattern applied to a filter bank and sampling circuit may be found in the publication Proceedings of the Institute of Radio Engineers, vol. 42, July 1954, pages 1159–1165, article entitled "Comb Filters for Pulsed Radar Use," by George and Zamanakos. The noise or jam amplitude envelope A clutters the actual target echo signal such that the target echo signal is hard or impossible to detect in the cluttered or jammed signal. The receiver Doppler amplifier 10 amplifies the signals applied thereto and, with an automatic gain control circuit as will soon be described, will produce a frequency signal on the output 12 of constant amplitude as shown by the envelope B. This jammer noise signal being of random frequencies will saturate the filter bank 13 rendering the selection of a target by the sampler circuit impossible.

As more particularly shown and described in the prior mentioned patent application of Aasen and Hetrick, a fast automatic gain control feedback circuit from the output of the amplifier 10 to its gain control circuit is accomplished and is disclosed generally herein by applying the Doppler amplifier output of conductor 12 over a conductor means 20 to a detector circuit 21. The detector circuit 21 will detect the radiation pattern of $$\frac{\sin x}{x}$$

to produce on its output 22 a direct-current lobe corresponding to the detected or rectified positive (or negative) portion of the $$\frac{\sin x}{x}$$

radiation pattern as shown by the waveform C. A fast or low-pass filter 23 coupled to the output 22 filters out the alternating-current component from the direct-current lobe as shown by the waveform D. Fast or low-pass filters of any well known type, such as shown and described in Section 5.20 of the text Practical Radio Communication, second edition, 1943, by Arthur R. Wilson and J. L. Hornung, and published by McGraw-Hill Book Company, Inc., may be used. The fast filter output 24 is conducted through a gate or blanking circuit 25, through an output conductor means 26, through a direct-current amplifier 27 and over conductor means 28 to the biasing amplifier control circuits of the Doppler amplifier 10. The gate or blanking circuit 25 is coupled by a conductor means 29 to the output conductor 15 of the sampler circuit to cause interruption of the circuit of the gate between the conductor means 24 and 26 upon the occurrence of any target signal appearing on the output conductor means 15 of the sampler circuit 14. Whenever the target echo signal is so cluttered with jam or noise signal that no target signal appears on the output conduction circuit 15 of the sampler circuit 14, the detected jam signal, in the form of a direct-current voltage lobe as shown by the waveforms D and E, will be applied to the gain control circuit of the Doppler amplifier 10 to reduce the gain thereof for the duration of the noise or jamming signal.

In accordance with the present invention, the detected jam or noise signal produced by the target to clutter a target echo signal is used by tapping into the automatic gain control feedback circuit and using the detected noise and jam signal, as shown by the waveform E, to position the target object. As herein illustrated, a conductor means 30 applies the direct-current control voltage in parallel to a chopper circuit 31 and a jam detector circuit 32. The jam detector 32 may be of any well known type detector which is responsive to rapid changes in voltage amplitude, such as a capacitor coupled vacuum tube thyratron detector. This detector 32, although conventional, is designated as a "jam" detector since it is responsive only to jam signals derived directly from the direct-current gain control voltage of the automatic gain control feedback circuit in this invention. As a detector it is responsive to any fast rising voltage signals capable of triggering the thyratron into conduction as more fully shown and described in the text Reference Data for Radio Engineers, fourth edition (1956), by the International Telephone and Radio Corporation, in the section "grid-controlled gaseous rectifiers," beginning on page 314. The chopper circuit 31 may be of the mechanical type shown in the text Practical Radio Communication, supra, section 13.3, and is driven by the scan rate generator 16 over the means 33 whereby the sampling rate and the chopping rate are synchronized. The chopper circuit 31 has an output 34 connecting it to a level adjusting circuit 35 to cut off or eliminate the lower amplitudes or "grass" of the chopped direct-current voltage applied thereto by the conductor means 34 illustrated in the waveform F. This level adjusting circuit 35 is a type of base clipping circuit shown and described in the text Electrical and Electronic Engineering, fourth edition, 1955, by F. E. Terman, chapter 18, section 18.2. The level adjusting circuit 35 is under the control of the direct-current gain control voltage coming by way of conductors 36 and 37 through a slow filter circuit 38, which filter 38 operates to smooth the direct-current voltage lobe, as shown by the waveform D, to a more constant direct-current voltage. The slow filter 38 may be of any well known type, sometimes referred to as a ripple filter or smoothing filter, more fully shown and described in the text Practical Radio Communication, supra, section 6.15. The level adjusted direct-current gain control voltage, as shown by the waveform G, is conducted over the conductor means 39 to a clipper circuit 40. The clipper circuit 40 may be of any well known type to clip the voltage peaks and clips the chopped direct-current gain control voltage shown by the waveform G to produce on the output 41 a voltage waveform illustrated by H. The output of the sampler circuit 14 over the conductor means 15 and the output of the clipper 40 over the conductor means 41 are applied to a switching means 44 to switch the output from 15 to 41. While the switching means 44 is shown by a separate block herein with an output conductor 45 adapted to be connected to a computer circuit or other subsequent circuitry as desired, it is to be understood that the switching circuit 44 may be incorporated in, or be a part of, the computer circuit or other subsequent circuitry, as desired. The switching circuit 44 normally places the input conductor 15 and the output conductor 45 in circuit which circuit may be switched between 41 and 45 upon the application of a voltage signal to a switch control means, as a solenoid or the like, by way of the conductor means 46 coming as an output of the jam detector circuit 32. As illustrated on the several waveforms the time interval of the $$\frac{\sin x}{x}$$

wave pattern of interest is time measured as shown by the reference characters $T_0$, $T_1$. As illustrated for the purpose of this invention, the wave pattern H shows the center of the clipped automatic gain control voltage by the reference character $\phi$ to illustrate the centroid or split beam of the jam signal in accordance with the dwell time of radar illumination of the target. The position of $\phi$ in the wave pattern H indicates the precise position of the target which must be computed in the subsequent equipment or computer circuits to which the output 45 is connected. It should therefore now become clear that the automatic gain control voltage of the automatic gain control circuit is useful in determining precise and exact target information which, when co-ordinated with antenna azimuthal and elevational antenna positioning information, can accurately position a target with reference to the Doppler radar receiver.

In the operation of the device illustrated in the figure of drawing, whenever a target object emits jam or noise signals which are received at the pulse Doppler transmitting source, the jam signals will appear as shown by envelope A on the input conductor 11 to the Doppler amplifier 10. The Doppler amplifier 10 produces a substantially constant amplifier output as shown by the envelope B for conduction to the filter bank 13 where the various frequency components will be channeled in the filter bank and these several channels repeatedly sampled by the sampler circuit 14 to select out the target echo frequency constituting an intelligence signal of the target's presence. This target echo pulse cluttered by jam signals, as illustrated by the envelope A, is likewise applied to the detector circuit 21 which circuit rectifies the noise component into a waveform illustrated by C on the output 22. The fast filter 23 removes the high frequency modulation from the waveform C and applies the direct-current voltage as illustrated by the waveforms D and E to the biasing circuit of the Doppler amplifier reducing the gain thereof inversely proportional to the jam signal strength to maintain a constant amplifier output. The detector 21, fast filter 23, gate 25, and direct-current amplifier 27 constitute a fast automatic gain control circuit more specifically described in the prior mentioned patent application of Aasen and Hetrick. The detected jam signal producing the gain control voltage represented by the waveform E is applied to the chopper circuit 31 and jam detector 32. The chopper circuit 31 operates in synchronism with the scanning rate of the sampler circuit by virtue of being controlled in chopper rate by the scan rate generator 16. The chopped gain control voltage E appears as the waveform F on the output 34 which is applied to the level adjusting circuit 35 under the control of the gain control voltage coming by way of 36 and slow filter 38 and the conductor means 37. The level adjusting circuit 35 will take out the background pulses and will yield a "burst" of modulated pulses representing the antenna beam pattern as shown by the waveform G. The waveform G is clipped by the clipper circuit 40 to produce a series of pulses H on the output 41 which are applied to the switching means 44 or computer circuit as desired. The jam detector 32 will become operative whenever the direct-current control voltage produces any quick changes, such as the control voltage E, to produce an output jam signal by way of conductor means 46 to switch the output 45 of the switch means 44 from its circuit from the sampler output 15 to the clipper output 41. The jam detector, for example, will become operative to produce an output jam signal on conductor means 46 at the point $T_0$ of the waveform E and this jam signal output will terminate at a time $T_1$ of waveform E which will cause the clipper output H to be passed through switched circuit 44 for the time duration from $T_0$ to $T_1$. In this manner the computer or other circuitry coupled to the output 45 of switch 44 will be conditioned for centroid seeking or beam splitting to precisely compute the position of the target object in space relative to the Doppler radar receiver. This precise position of the target is represented herein by the reference character $\phi$ on the waveform H to illustrate the means of target determination from the jam or noise signal emitted by the target. As may be readily realized from the description, any Doppler echo signal amplified by the Doppler amplifier 10 will be selected by the sampler circuit and conducted by way of the output 15 to the output 45 until the target emits jam signals or noise signals to clutter the Doppler echo signals of that target to the extent that the filter bank is saturated and the sampler circuit would be unable to select out the target object in the several frequency channels of the filter bank 13. Each jam signal thereafter becomes useful in the jam circuits to produce the clipped voltage signal H from the automatic gain control voltage circuit. This circuit arrangement enables the Doppler radar to utilize jam signals for target position indication or other use in the fire control system incorporating Doppler radar.

While many modifications and changes may be made in the basic illustration shown by the drawing herein to accomplish the same or similar results of this invention I desire to be limited in the scope of my invention only to the extent within the spirit of the description herein and the scope of the claims appended hereunder.

I claim:

1. In an electromagnetic wave receiving system for receiving desirable signals having a high probability of being cluttered with undesirable signals, the signals being conducted through a receiver amplifier to a sampled filter bank with an automatic gain control feedback for the amplifier to control gain inversely to undesirable signal strength, the invention which comprises: a chopper and a clipper circuit coupled serially to the automatic gain control circuit for receiving direct-current control voltage swings therefrom indicative of desirable signals received with undesirable clutter thereon and producing chopped and clipped direct current control voltage on an output thereof; a detector circuit coupled to said automatic gain control circuit to receive said direct current control voltage swings to produce a voltage signal on an output thereof for each detected amplitude rise of said direct current control voltage swings; and a switching means coupled to receive the outputs of said sampled filter bank, clipper circuit, and detector circuit for alternately switching the signals of said sampled filtered bank and said chopper and clipper circuit to an output thereof, said detector voltage signal output coupled as an input to said switching means being operative to switch said chopped and clipped direct current control voltages to the switching means output whenever a detector voltage signal occurs.

2. In a target detection system utilizing an automatic gain control circuit to control the gain of an amplifier of noise and intelligence signals conducted to a filter-sampler circuit, the invention which comprises: a chopper circuit coupled to the automatic gain control circuit for electrically chopping the direct-current control voltage therefrom; a clipper circuit coupled to said chopper circuit for clipping said chopped direct-current voltage; and a detector circuit coupled to the automatic gain control circuit to receive said direct current control voltage to produce a voltage signal for each voltage amplitude gain of said direct current control voltage and having an output coupled to means controlling the output of said clipper circuit to pass said clipped voltages when said detector circuit detects an amplitude gain in direct-current control voltage in said automatic gain control circuit and to block passage of clipped direct-current voltages when no amplitude gains appear in said automatic gain control circuit.

3. In a target detection system as set forth in claim 2 wherein said automatic gain control circuit is responsive to jamming noise signals superimposed on intelligence signals and said chopper, clipper circuits and detector circuit are responsive to direct-current control voltages derived from noise signals passed by said amplifier.

4. In a pulse Dopper receiver system having a Doppler amplifier for conducting received target signals to a sampled filter bank to select target signals from noise cluttered jam signals, the system having an automatic gain control feedback for the amplifier to control the gain thereof inversely to jam signal strength, the invention which comprises: a chopper, a jam detector, and a filter coupled to the automatic gain control circuit in parallel; a level adjustment control circuit and a clipper circuit serially coupled to the output of said chopper circuit, said level adjustment control circuit being coupled to said filter in a manner arranged to limit the lower level of the chopped jam signals in proportion to jam signal strength, and said jammed detector receiving said automatic gain control voltage including jamming signals and producing a signal on an output thereof upon the occurrence of each jam signal in said automatic gain control circuit; and a switching means having the output of said sampled filter bank, the output of said clipper circuit, and the output of said jam detector coupled as inputs thereto, said switching means being constructed and arranged to alternately switch the outputs of said sampled filter bank through said switching means in the absence of a jam detector output signal and the output of said clipper circuit in the presence of the jam detector output signal whereby a target may be evaluated in; subsequent circuitry equally well from target signal information and jam signal information received.

5. In a pulse Doppler receiver as set forth in claim 4 wherein said chopper circuit is coupled to the automatic gain control circuit of said receiver system in a manner to chop jam signals at a rate synchronized with the sampling rate of said sampled filter bank.

6. A receiver amplifier system for receiving intelligence signals subject to being cluttered by noise signals comprising: a receiver amplifier for amplifying electromagnetic wave signals including intelligence signals in accordance with controlled gain; and automatic gain control feedback circuit from the amplifier output to the gain control thereof for converting noise signal information into direct-current gain control voltage to control amplifier gain inversely proportional to noise signal strength; chopper and detector means coupled in parallel to said automatic gain control feedback circuit, said chopper having a clipper circuit coupled serially therewith to clip all chopped direct-current control voltage, and said detector being operative to detect voltage amplitude gain in said direct-current control voltage; and a switching means in a coupling of the output of said clipper circuit to switch same to an external circuit, the detector output being coupled to said switching means to control the application of said clipper circuit output to said external circuitry whereby target signal information may be produced equally from intelligence signals amplified by said amplifier and from noise signals cluttering the intelligence signals and converted to direct-current control voltage.

7. A receiver amplifier system as set forth in claim 6 wherein the lower amplitude level, of the chopped direct-current control voltage is controlled in proportion to the amplitude of said direct-current control voltage by leveling means serially coupled in said serial coupling between said chopper and said clipper circuits.

8. A pulse Doppler receiver system for obtaining target signal information equally from target echo signals and jam clutter signals from the target source comprising: a Doppler amplifier having its output coupled to a sampled filter bank for amplifying target echo and jam signals in accordance with the gain control thereof; a sampling means for sampling said filter bank for target echo signals; an automatic gain control feedback circuit from the amplifier output to the gain control thereof for converting jam signals into direct-current gain control voltage proportional to jam signal strength; a chopper circuit and a jam signal detector coupled in parallel to said automatic gain control circuit to receive said direct-current gain control voltage, said chopper circuit producing chopped direct-current gain control voltage on the output thereof, and said jam signal detector producing a voltage signal on the output thereof resulting from each occurrence of an amplitude rise in direct-current gain control voltage; means coupled to the output of said chopper circuit for controlling the lower amplitude level of the chopped control voltage; a clipper circuit coupled to said chopper circuit through said means for clipping the chopped control voltage to produce a chopped and clipped direct-current voltage on the output of said clipper circuit; and an output switching means for selectively switching conduction of the output signals from said sampling means and from said clipper circuit, the output of said jam signal detector being coupled to said output switching means to switch said switching means to conduct said chopped and clipped direct-current voltage signals through said switching means resulting from the occurrence of a jam signal detector output signal whereby the output switching means will selectively pass target echo voltage signals and voltage signals representative of target signal information.

9. A pulse Doppler receiver system as set forth in claim 8 wherein said means coupled to the output of said chopper circuit for controlling the lower amplitude level is a level adjusting circuit coupled through a filter to the automatic gain control feedback circuit.

No references cited.